Dec. 2, 1952  J. MALY ET AL  2,620,199
DIRIGIBLE SLED
Filed March 23, 1950  3 Sheets-Sheet 1
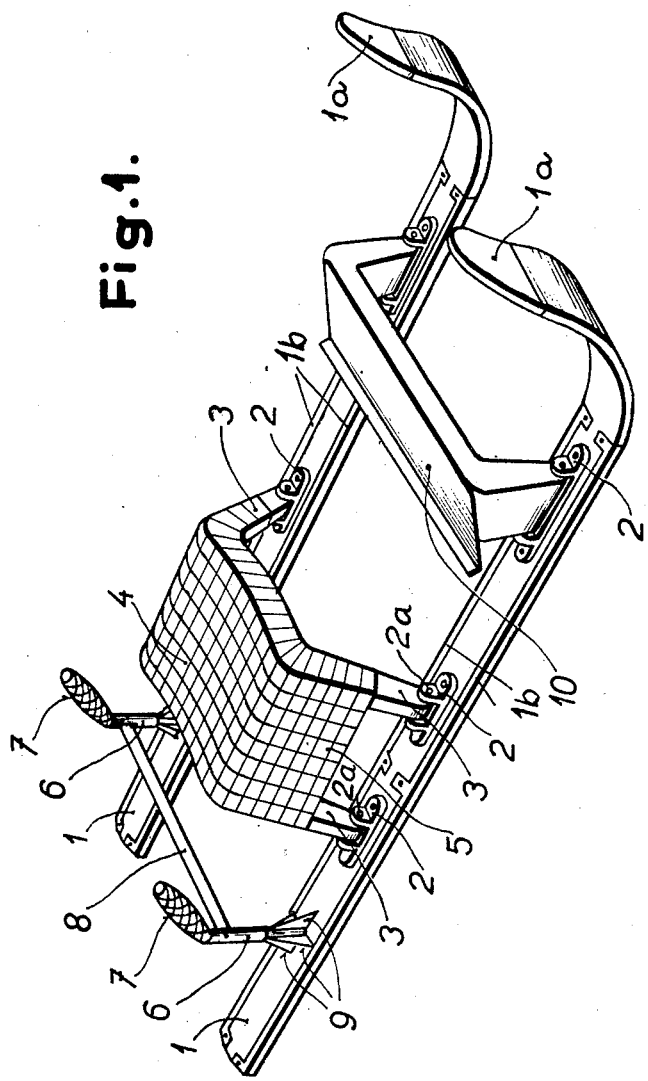
INVENTORS
Jaroslav Maly and Felix Kodes
BY
ATTORNEY

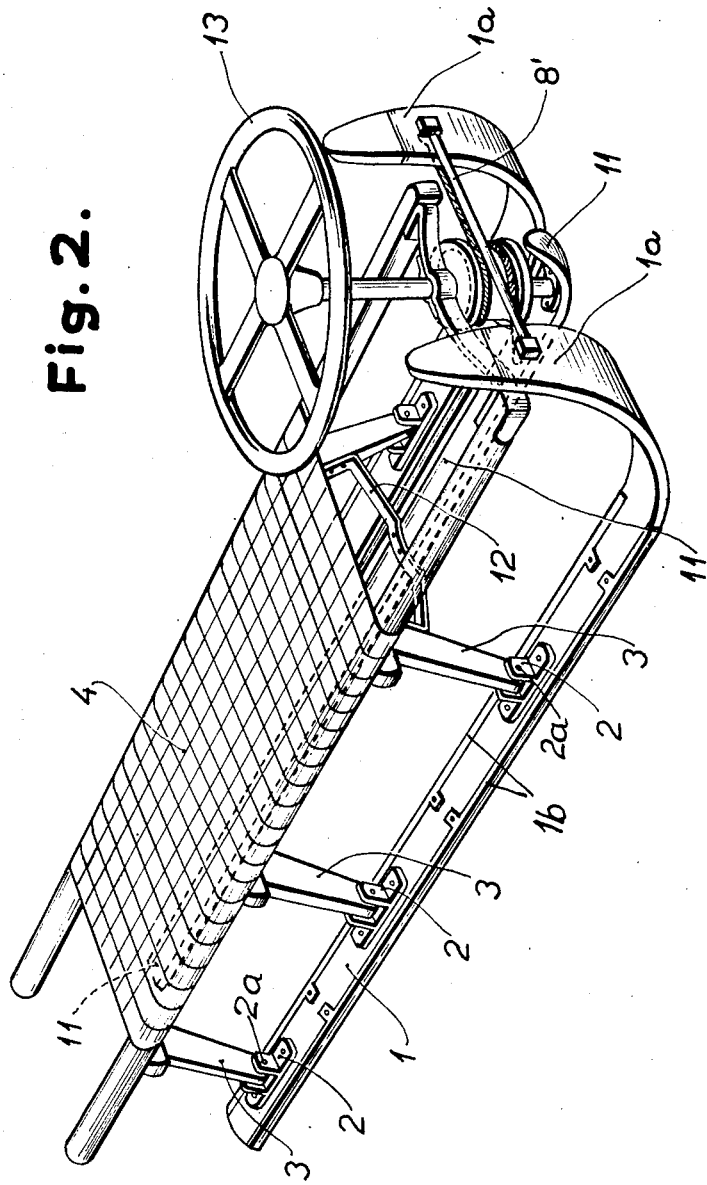

Dec. 2, 1952 J. MALY ET AL 2,620,199
DIRIGIBLE SLED
Filed March 23, 1950 3 Sheets-Sheet 3
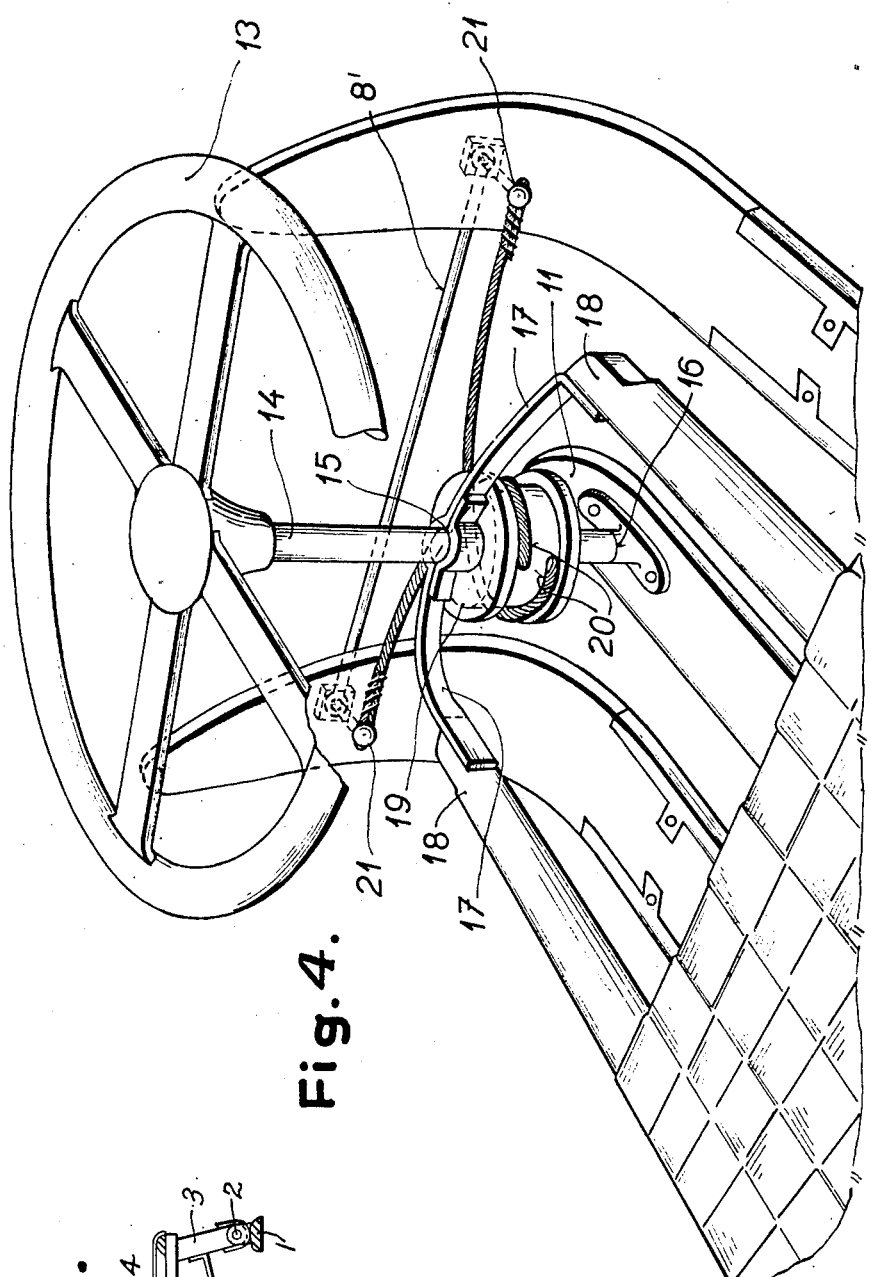
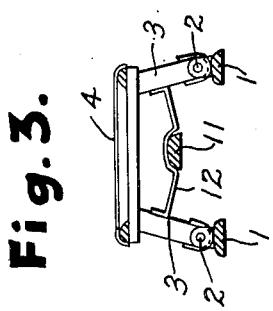
INVENTORS
Jaroslav Maly and Felix Kodes
BY
ATTORNEY Patented Dec. 2, 1952

2,620,199

UNITED STATES PATENT OFFICE 2,620,199

DIRIGIBLE SLED

Jaroslav Malý and Felix Kodeš,
Prague, Czechoslovakia

Application March 23, 1950, Serial No. 151,394
In Czechoslovakia December 22, 1949

2 Claims. (Cl. 280—21)

This invention relates to dirigible sleds.

In order to permit a more effective steering of a sled than may be accomplished by mere shifting of the body weight of the rider or riders, sleds have been provided with braking spurs engaging the snow or ground to one side of the sled. This kind of steering is successful only when the sled moves over a relatively rigid snow ground since spurs of any kind do not catch satisfactorily on deep or powder snow. Another method of steering is based on the construction of the sled of two sections, a movable front section and a rear section, the sled being steered by swinging the front section so that its longitudinal axis makes a desired angle with the longitudinal axis of the sled. The so-called "bobs" fall into this category. To enable steering of such bob-like sleds, at least the rear part of the runners have to be narrow. Sleds with narrow runners, however, again require a rigid ground. Other known sled constructions also required a rigid, and in some cases, an icy course. With the sleds hitherto known it was further difficult or impossible to cut a slope diagonally. Thus, the use of sleds was very limited, especially for sport purposes.

It is an object of this invention to provide a dirigible sled which can be steered very easily and reliably also when sliding down on new or powder snow. This is achieved by providing the sled with runners which are tiltable about their longitudinal axes. Thereby, adjustment of the gliding surfaces of the runners so as to make an optimum angle with a slope or incline, even when cutting the latter diagonally, is made possible.

In a preferred form of the invention the runners are in the shape of skis, terminating at the front in horns possessing a large radius of curvature. The tips of these horns, which may be either straight or S-shaped, extend up to the height of, or higher than, the seat of the sled.

The tilting of the runners may be achieved by various mechanical means, such as levers, pulling rods, ropes, chains or steering wheels. If desired, handles controlling the tilting of the runners may be attached directly to the horns or to the rear ends of the runners. It is further possible to equip the upper side of the runners with pedals or bindings, wherein the shoes of the rider are placed as in ski bindings. The tilting of the runners is then accomplished with the feet, much the same as in skiing.

An auxiliary runner may be placed above the plane of, and midway between, the tiltable runners. This auxiliary runner has the purpose to prevent the sled from sinking deeply into loose snow and at the same time serves as a stiffening element of the carrying structure of the sled. It may also be utilized for the attachment thereon of a centrally located steering mechanism or the like.

The tiltable arrangement of the runners permits the sled to be sharply inclined with respect to steep slopes. In view thereof the invention also contemplates to provide seating facilities not only in the conventional manner on the top of the sled, but also on the sides of the sled.

Further objects and advantages of the invention will appear as the description proceeds, reference being had to the accompanying drawing which illustrates by way of example two embodiments of the invention, and in which:

Fig. 1 shows a single seater sled operable by steering handles;

Fig. 2 shows a sled seating several riders and having a steering wheel;

Fig. 3 is a vertical sectional view of the sled of Fig. 2, the section being taken perpendicularly to the longitudinal axis of the sled a short distance behind the steering wheel; and Fig. 4 is a fragmentary perspective view of the steering wheel mechanism of Fig. 2 at a larger scale.

The sled shown in Fig. 1 comprises two runners 1 tiltably mounted by means of hinges 2 whose pins 2a are fixedly carried by posts 3. Each of the longitudinal edges of the runners 1 may be provided with a metal ridge 1b. Supported by the posts 3 is a seat 4 having girths 5 extending downwardly over a part of the posts 3. The runners terminate at their front ends in slightly S-shaped horns 1a whose points extend approximately to the height of the seat 4.

The runners 1 may be tilted about the axis of the hinges 2 by means of levers 6 ending in handles 7, which, in the example shown, are situated behind the seat 4. The two levers 6 are anchored in the runners 1 by means of props 9. Fig. 1 shows the two levers 6, 7 joined by a rod 8. With the levers 6, 7 so connected by the rod 8 both runners 1 will carry out in unison any tilting movements imparted to them by means of the handles 7, that is to say, both runners will always tilt into positions which are parallel to each other.

By tilting both the runners 1 about their longitudinal axes through the same angle relative to the plane of the terrain, also the horns 1a of the runners are inclined in parallel toward the snow and cut into the snow layer an arc which determines the change of direction of the sled. When the horns cut into the snow, a braking momentum develops which reaches its theoretical maximum when the runners are tilted about 90° and the longitudinal axes of the horns come to lie in a plane parallel to the surface of the snow.

Also mounted in hinges 2 attached to the runners 1 is a support 10 which carries a board on which the rider may place his feet.

Depending on the larger or smaller inclination of a slope to be traversed, the runners have to be tilted for a larger or a smaller angle. In some cases the tilting angle may become so great that the rider could not remain on the seat 4. In such a case the seat extensions 5 will be found to be of great convenience.

The sled shown in Figs. 2 and 3 which is intended to accommodate a plurality of riders, has again two runners 1 tiltably mounted by means of hinges 2 on posts 3, which support a seat 4. While there are shown three pairs of posts 3, a smaller or larger number of hinged posts may be used. As in Fig. 1, the runners 1 may be provided with metal ridges 1b and may terminate in horns 1a. While in Fig. 1 the horns 1a are shown as being of S-shape, Fig. 2 shows horns extending straight upwards to a point slightly above the plane of the seat 4. The straight shape of the points of the horns gives a stronger braking action when dipping into the snow than do S-shaped horns.

Halfway between the tiltable runners 1 there is provided an auxiliary runner 11, whose gliding surface is disposed above the plane of the gliding surfaces of the runners 1 when the latter are not tilted. The auxiliary runner 11 is attached to the cross bars 12 extending between one or more of the pairs of posts 3.

The straight tips of the runner horns 1a are interconnected by means of a spacing link 8'. Supported near the front end of the auxiliary runner 11 in a bearing 16 is a rotatable steering column 14 carrying a steering wheel 13. The column 14 passes through a second bearing 15 carried by a transverse member 17 secured to the front ends 18 of the frame of the sled.

As shown more clearly in Fig. 4, there is fixedly mounted on the rotatable column 14 a pulley 19 having attached thereto one end of each of two wire cables 20. The other end of each of the two cables 20 is secured to a pin 21. Each of the two pins 21 extends through one of the two runner horns 1a, the two pins 21 being connected to each other by the already mentioned spacing link 8'. Turning of the column 14 by means of the steering wheel 13 and thereby also of the pulley 19 will wind up a certain length of the one cable and unwind to the same extent the other cable, thus causing the two interlinked runners 1 to tilt for the same amount about the axes of the hinges 2.

From the foregoing it will be apparent that the new sled can be brought to any angle relative to the surface of the course which may be desirable in view of varying configurations of sloping courses and/or in view of the quality of the snow, such as deep loose snow. Not only is it possible to carry out with the new sled almost all movements possible in skiing—for instance steep slopes may be traversed in slalom style with it—but movements are made possible which would be impossible either in skiing or with non-dirigible sleds or with dirigible sleds as hitherto known. The proper operation of the sled according to the invention is easily learned and requires much less skill than is necessary for faultless skiing.

While I have shown in the drawing two specific embodiments of the invention, I desire it to be understood that these embodiments have been given by way of example only, since various changes in the details of the constructions shown may be made without departing from the spirit of the invention or the scope of the appended claims.

What we claim, is:

1. A dirigible sled comprising a pair of runners, a seat, supports for said seat, said runners being attached to said supports so as to be tiltable each substantially about its longitudinal axis, operating means for tilting said runners including a steering wheel and a steering column, and an auxiliary runner mounted stationarily in a plane situated above the plane of said two tiltable runners, the lower end of said steering column being supported in a bearing mounted on said auxiliary runner.

2. A dirigible sled comprising a pair of runners, a seat, supports for said seat, said runners being attached to said supports so as to be tiltable about substantially their longitudinal axes, each of said runners being in the shape of a ski and terminating at its front end in an upwardly extending horn, an auxiliary runner mounted stationarily between said tiltable runners but in a plane above the plane of said tiltable runners, a steering wheel, a steering column turnable by said steering wheel, the lower end of said steering column being supported in a bearing mounted on said auxiliary runner, a pulley secured to said column, at least one flexible elongated member having one end attached to the horn of one of said runners and another end to the horn of the other of said runners and being so guided over said pulley that upon turning of said pulley in either direction a portion of said elongated member extending between said pulley and the horn of one of said runners is wound upon the pulley and thereby that portion of said elongated member is shortened, whereas the portion of said elongated member extending between the pulley and the horn of the other of said runners is unwound from said pulley and thereby that last named portion of said elongated member is lengthened, said horns being interlinked by means of a transverse spacing rod.

JAROSLAV MALÝ.
FELIX KODEŠ.

REFERENCES CITED

The following references are of record in the file of this patent:

UNITED STATES PATENTS

| Number | Name | Date |
|---|---|---|
| 367,280 | Emerson | July 26, 1887 |
| 678,651 | Erickson | July 16, 1901 |
| 1,888,857 | Greene | Nov. 22, 1932 |
| 2,099,731 | Gelbman | Nov. 23, 1937 |
| 2,317,048 | Fosbak | Apr. 20, 1943 |
| 2,323,847 | Sampsell | July 6, 1943 |

FOREIGN PATENTS

| Number | Country | Date |
|---|---|---|
| 42,433 | Austria | May 25, 1910 |
| 46,758 | Sweden | Mar. 31, 1920 |
| 49,821 | Switzerland | Jan. 21, 1910 |
| 137,909 | Switzerland | Apr. 16, 1930 |
| 477,734 | Germany | June 13, 1929 |